(12) United States Patent
Sunayama (10) Patent No.: US 11,977,464 B2
(45) Date of Patent: May 7, 2024

(54) ERROR RATE MEASURING APPARATUS AND ERROR RATE MEASURING METHOD

(71) Applicant: ANRITSU CORPORATION, Kanagawa (JP)

(72) Inventor: Ryo Sunayama, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/656,502

(22) Filed: Mar. 25, 2022

(65) Prior Publication Data

US 2022/0398177 A1 Dec. 15, 2022

(30) Foreign Application Priority Data

Jun. 9, 2021 (JP) .................. 2021-096656

(51) Int. Cl.
*G06F 11/263* (2006.01)
*G06F 11/07* (2006.01)
*G06F 11/273* (2006.01)
*G06F 11/30* (2006.01)

(52) U.S. Cl.
CPC .......... *G06F 11/263* (2013.01); *G06F 11/076* (2013.01); *G06F 11/0772* (2013.01); *G06F 11/2733* (2013.01); *G06F 11/3075* (2013.01)

(58) Field of Classification Search
CPC .. G06F 11/263; G06F 11/076; G06F 11/0772; G06F 11/2733; G06F 11/3075; G06F 11/08

USPC .......................................................... 714/738
See application file for complete search history.

(56) References Cited

U.S. PATENT DOCUMENTS

| | | | | |
|---|---|---|---|---|
| 11,467,909 B1* | 10/2022 | Jeon | .................... | G06F 11/0745 |
| 2013/0145212 A1* | 6/2013 | Hsu | ..................... | G06F 11/2733 |
| | | | | 714/27 |
| 2015/0324265 A1* | 11/2015 | Nelson | .................. | G06F 11/263 |
| | | | | 714/43 |
| 2016/0179647 A1* | 6/2016 | Das Sharma | ......... | G06F 11/221 |
| | | | | 714/736 |
| 2019/0303227 A1* | 10/2019 | Nakamura | ............ | G06F 11/076 |
| 2020/0201718 A1* | 6/2020 | Richter | ............... | G06F 11/1004 |
| 2022/0405179 A1* | 12/2022 | Lee | ..................... | G06F 11/2635 |

FOREIGN PATENT DOCUMENTS

| | | | |
|---|---|---|---|
| JP | 2007-274474 A | 10/2007 | |
| JP | 2017-098615 A | 6/2017 | |

* cited by examiner

*Primary Examiner* — James C Kerveros
(74) *Attorney, Agent, or Firm* — Pearne & Gordon LLP (57) ABSTRACT

An error rate measuring apparatus detects a bit error of input data returned from a device under test with transmission of a test signal at an error detector, and includes a log recording unit that records log data of state transition of each lane by handshakes of a plurality of lanes in a predetermined communication standard with respect to the device under test in making the device under test transit to a state of LOOP-BACK, and a display unit that displays the recorded log data of the state transition of each lane in a time-series order.

8 Claims, 7 Drawing Sheets

| Lane0 | | | |
|---|---|---|---|
| Time[ns] | Delta Time[ns] | State | Speed[GT/s] |
| 0 | 3486228 | INITIAL | LFPS |
| 3486228 | 8.1E+09 | DETECT_ACTIVE | LFPS |
| 8097965380 | 1.3E+07 | POLLING_LFPS_SCD1 | LFPS |
| 8110740004 | 209920 | POLLING_LFPS_PLUS | LFPS |
| 8110949924 | 72692 | POLLING_LFPS_ENDSCD | LFPS |
| 8111022616 | 353468 | POLLING_PORT_MATCH | LFPS |
| 8111376084 | 1.2E+07 | POLLING_PORT_CONFIG_READY | LFPS |
| 16850281744 | 26404 | POLLING_PORT_ENDLBPM | LFPS |
| 16850308148 | 5251524 | POLLING_RXEQ | 10 |
| 16850308200 | | | |
| 16855559400 | | | |
| 16855559672 | 1764816 | POLLING_ACTIVE | 10 |
| 16855559800 | | | |
| 16857324488 | 800 | POLLING_CONFIGURATION | 10 |
| 16857324800 | 500 | POLLING_CONFIGURATION (Waiting for other lane) | 10 |
| 16857325288 | 12 | POLLING_IDLE | 10 |
| 16857325288 | | | |
| 16857325300 | 0 | LOOPBACK_ACTIVE | 10 |

FIG. 4

| Lane1 | | |
|---|---|---|
| Delta Time[ns] | State | Speed[GT/s] |
| | | |
| | | |
| | | |
| | | |
| | | |
| | | |
| | | |
| | | |
| 5251524 | POLLING_RXEQ | 10 |
| 1764816 | POLLING_ACTIVE | 10 |
| | | |
| 500 | POLLING_ACTIVE(Waiting for other lane) | 10 |
| 800 | POLLING_CONFIGURATION | 10 |
| | | |
| 12 | POLLING_IDLE | 10 |
| 5 | POLLING_IDLE(Waiting for other lane) | 10 |
| 0 | LOOPBACK_ACTIVE | 10 |

FIG. 5

| Lane0 | | | |
|---|---|---|---|
| Time[ns] | Delta Time[ns] | State | Speed[GT/s] |
| 0 | 3486228 | INITIAL | LFPS |
| 3486228 | 8.1E+09 | DETECT_ACTIVE | LFPS |
| 8097965380 | 1.3E+07 | POLLING_LFPS_SCD1 | LFPS |
| 8110740004 | 209920 | POLLING_LFPS_PLUS | LFPS |
| 8110949924 | 72692 | POLLING_LFPS_ENDSCD | LFPS |
| 8111022616 | 353468 | POLLING_PORT_MATCH | LFPS |
| 8111376084 | 1.2E+07 | POLLING_PORT_CONFIG_READY | LFPS |
| 16850281744 | 26404 | POLLING_PORT_ENDLBPM | LFPS |
| 16850308148 | 5251524 | POLLING_RXEQ | 10 |
| 16850308200 | | | |
| 16855559400 | | | |
| 16855559672 | 1.2E+07 | POLLING_ACTIVE | 10 |
| 16855559800 | | | |
| | 3486228 | INITIAL | LFPS |

ERROR RATE MEASURING APPARATUS AND ERROR RATE MEASURING METHOD

TECHNICAL FIELD

The present invention relates to an error rate measuring apparatus and an error rate measuring method that transmits a known pattern as a test signal to a device under test in a state in which the device under test has transited to a state of a signal pattern return, and measures a bit error rate of input data returned from the device under test with the transmission of the test signal.

BACKGROUND ART

For example, as disclosed in Patent Document 1 described below, an error rate measuring apparatus is hitherto known as an apparatus that transmits a test signal of a known pattern including fixed data to a device under test and compares a signal under test returned from the device under test with the transmission of the test signal with a reference signal to be a reference in units of bits to measure a bit error rate (BER).

As this kind of error rate measuring apparatus, for example, as disclosed in Patent Document 2 described below, there is known an error rate measuring apparatus having a function of recording, for each transition of a link state of a link state management mechanism, log data including a transition destination of the link state, an occurrence time of the transition, a trigger of the transition, and error information.

RELATED ART DOCUMENT

Patent Document

[Patent Document 1] JP-A-2007-274474
[Patent Document 2] JP-A-2017-098615

DISCLOSURE OF THE INVENTION

Problem that the Invention is to Solve

Incidentally, in the standard of a high speed serial bus including Peripheral Component Interconnect Express (PCIe) and Universal Serial Bus (USB), in performing a test of a receiver as a device under test, a method that, after executing a handshake for making the receiver transit to a signal return mode (LOOPBACK) dedicated to the test, inputs a known pattern for a test and confirms an error rate of a returned signal is commonly used.

Then, in a test of the high speed serial bus, in a case where the error rate measuring apparatus has a function capable of outputting log data of the handshake, it is useful at the time of debugging, and it is possible to clarify which state in the handshake fails.

In the USB 3.2 standard published in recent years, an ×2 mode where communication is performed in two lanes is defined. In a handshake of the two-lane mode, there is a need to perform the handshake in each of Lane 0 and Lane 1. In this case, for example, an operation that, even though a state transition condition for progressing to a next state is satisfied in Lane 1 (Lane 0), Lane 1 (Lane 0) does not transit to the next state until Lane 0 (Lane 1) satisfies the state transition condition is defined in the standard.

Note that the error rate measuring apparatus disclosed in Patent Document 2 described above has merely a function of displaying a time line of state transition, and cannot simultaneously record log data of state transition by the handshake of a plurality of lanes. In addition, it is not possible to display, as a log, whether or not the state transition conditions are satisfied among a plurality of lanes. For this reason, in the error rate measuring apparatus of the related art, there is a problem in that a failure cause is hardly analyzed in the handshake of a plurality of lanes.

Accordingly, the invention has been accomplished in view of the above-described problem, and an object of the invention is to provide an error rate measuring apparatus and an error rate measuring method capable of simultaneously recording or displaying log data of state transition by a handshake of a plurality of lanes.

Means for Solving the Problem

To achieve the above-described object, there is provided an error rate measuring apparatus 1 according to a first aspect of the invention having a pattern generator 2 that, in a state in which a device under test W has transited to a state of a signal pattern return in a predetermined communication standard, transmits a test signal of a known pattern to a device under test, and an error detector 3 that detects a bit error of input data returned from the device under test with the transmission of the test signal.

The predetermined communication standard is a standard for performing communication in a plurality of lanes. The error rate measuring apparatus 1 includes a log recording unit 19 that records log data of state transition of each lane in making the device under test transit to the state of the signal pattern return.

According to a second aspect of the invention, in the error rate measuring apparatus according to the first aspect,
the log data includes log data indicating a state in which a lane satisfies a state transition condition for progressing to a next state and waits until another lane satisfies the state transition condition.

According to a third aspect of the invention, the error rate measuring apparatus of the first or second aspect further includes
a display unit 21 that displays the log data of the state transition of each lane recorded in the log recording unit 19 in a time-series order.

According to a fourth aspect of the invention, in the error rate measuring apparatus of any one of the first to third aspects,
the communication standard is a communication standard of a high speed serial bus.

According to a fifth aspect of the invention, there is provided an error rate measuring method for an error rate measuring apparatus having a pattern generator 2 that, in a state in which a device under test W has transited to a state of a signal pattern return in a predetermined communication standard, transmits a test signal of a known pattern to the device under test, the predetermined communication standard being a standard for performing communication in a plurality of lanes, and an error detector 3 that detects a bit error of input data returned from the device under test with the transmission of the test signal. The error rate measurement method includes
a step of recording log data of state transition of each lane in making the device under test transit to the state of the signal pattern return at a log recording unit 19 provided in the error detector.

According to a sixth aspect of the invention, in the error rate measuring method according to the fifth aspect, the log data includes log data indicating a state in which a lane satisfies a state transition condition for progressing to a next state and waits until another lane satisfies the state transition condition.

According to a seventh aspect of the invention, the error rate measuring method according to the fifth or sixth aspect further includes a step of displaying the log data of the state transition of each lane recorded in the log recording unit 19 in a time-series order on a display unit 21.

According to an eighth aspect of the invention, in the error rate measuring method of any one of the fifth to seventh aspects, the communication standard is a communication standard of a high speed serial bus.

Advantage of the Invention

According to the invention, it is possible to simultaneously record or display log data of state transition by a handshake of a plurality of lanes, and it is possible to allow a user to easily specify a lane and a test in which a cause of handshake failure occurs, in testing the standard of a plurality of lanes. As a result, since the user can specify a test and a lane that has a problem, it is possible to extremely efficiently perform debugging of an HSB device.

BEST MODE FOR CARRYING OUT THE INVENTION

Hereinafter, a mode for carrying out the invention will be described in detail referring to the accompanying drawings.

The invention relates to an error rate measuring apparatus and an error rate measuring method that, in the standard of, for example, a high speed serial bus (HSB), such as PCIe or USB, sets a device equipped with a link training & status state machine (LTSSM) as a link state management mechanism for managing a link state, as a device under test, transmits a test signal of a known pattern to the device under test in a measurement mode in a state in which the device under test has transited to a state (LOOPBACK) of a signal pattern return, and measures a bit error rate of input data returned from the device under test with the transmission of the test signal. The LTSSM exists in a physical layer and looks at a signal received by the physical layer to perform transition.

Figure 1:
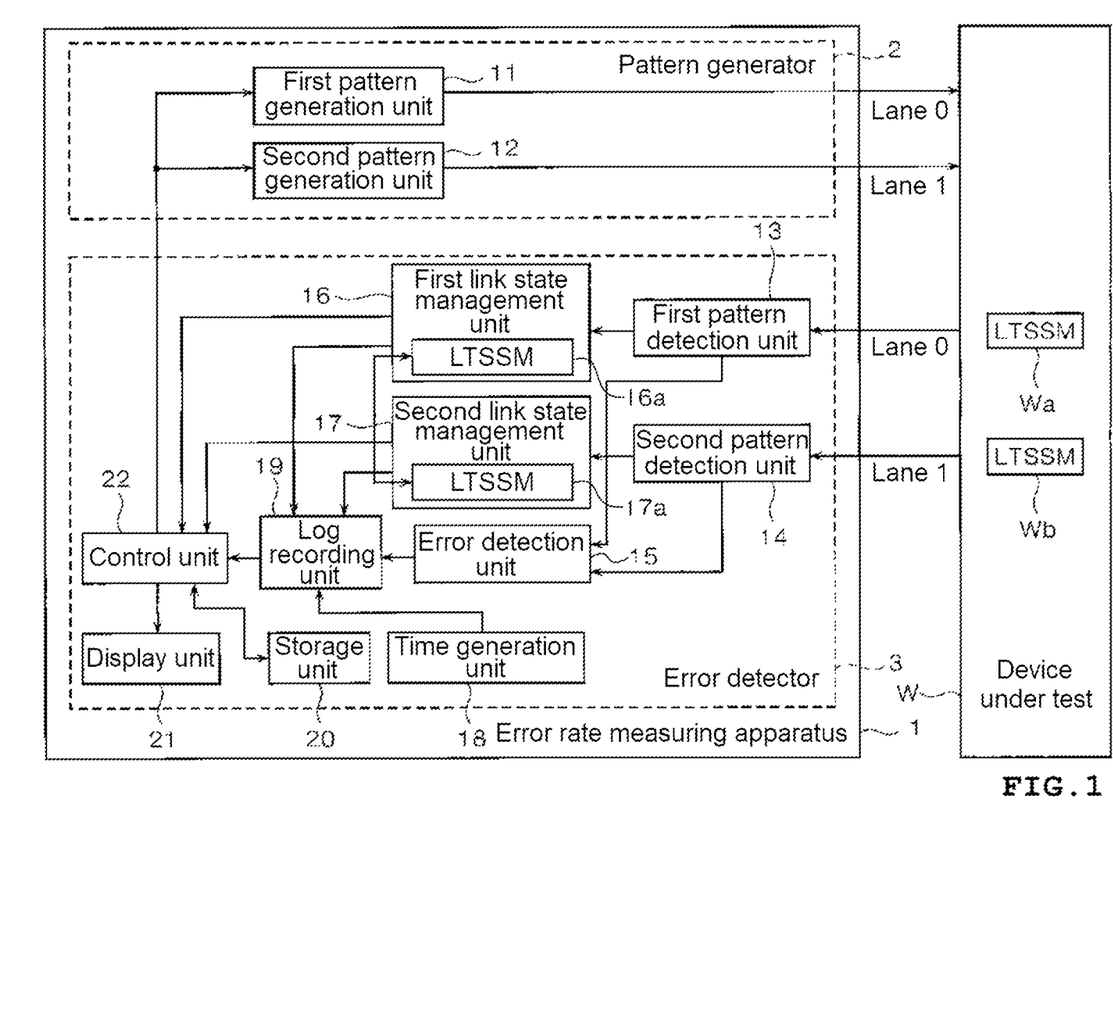
FIG. 1 is a block configuration diagram of an error rate measuring apparatus according to the invention.

As shown in FIG. 1, an error rate measuring apparatus 1 of embodiment schematically includes a pattern generator 2 and an error detector 3, is equipped with a sequence of making a link state of the LTSSM of the device under test W to a state of LOOPBACK, and has a function of, for a plurality of lanes of a predetermined communication standard (for example, HSB, such as PCIe or USB), simultaneously recording and displaying log data of state transition of each lane by a handshake (including log data of a state of waiting until a state transition condition of another lane is satisfied) before a measurement mode where a known pattern signal is input to the device under test W to measure a bit error rate.

Hereinafter, a case corresponding to the USB 3.2 standard that defines a two-lane mode where communication is performed in Lane 0 and Lane 1 will be described as an example.

The device under test W is equipped with an LTSSM (Wa) that manages a link state of Lane 0 and an LTSSM (Wb) that manages a link state of Lane 1, is connected to the error rate measuring apparatus 1 through a test fixture (not shown) in a training mode where a handshake in the two-lane mode before measurement of a bit error rate is performed, and starts to transmit a Low Frequency Periodic Signaling (LFPS) signal with the detection of the connection.

The pattern generator 2 generates a pattern that is transmitted to the device under test W, and includes a first pattern generation unit 11 and a second pattern generation unit 12.

The first pattern generation unit 11 is provided corresponding to Lane 0 and generates a training pattern signal of Lane 0 based on an LTSSM 16a under the control of a control unit 22 described below in a training mode for making the LTSSM (Wa) of the device under test W transit to the state of LOOPBACK.

The first pattern generation unit 11 generates a pattern signal (a compliance pattern (CP) of a pattern that includes a pseudo random binary signal sequence by an NRZ signal of "0" and "1" and is provided in the standard) of Lane 0 of a known pattern that is input to the device under test W, under the control of the control unit 22 described below in a measurement mode where a jitter tolerance test of the device under test W is performed in a state in which the device under test W is transiting to the state of LOOPBACK.

The second pattern generation unit 12 is provided corresponding to Lane 1 and generates a training pattern signal of Lane 1 based on the LTSSM 17a under the control of the control unit 22 described below in a training mode for making the LTSSM (Wb) of the device under test W to the state of LOOPBACK.

The second pattern generation unit 12 generates a pattern signal (a CP of a pattern provided in the same standard as the pattern signal of Lane 0) of Lane 1 of a known pattern that is input to the device under test W, under the control of the control unit 22 in the measurement mode of the device under test W.

The error detector 3 detects the pattern signal transmitted from the device under test W, and includes a first pattern detection unit 13, a second pattern detection unit 14, an error detection unit 15, a first link state management unit 16, a second link state management unit 17, a time generation unit 18, a log recording unit 19, a storage unit 20, a display unit 21, and the control unit 22.

The first pattern detection unit 13 is provided corresponding to Lane 0 and detects the training pattern signal of Lane 0 transmitted from the device under test W depending on the transition of the state of the LTSSM (Wa) of the device under test W with a handshake by the training pattern signal of Lane 0 transmitted from the first pattern generation unit 11 of the pattern generator 2 in the training mode.

In the measurement mode, when the pattern signal of Lane 0 generated by the first pattern generation unit 11 of the pattern generator 2 is input to the device under test W, the first pattern detection unit 13 detects the pattern signal of Lane 0 returned and input from the device under test W with the input of the pattern signal of Lane 0.

The second pattern detection unit 14 is provided corresponding to Lane 1 and detects the training pattern signal of Lane 1 transmitted from the device under test W depending on the transition of the state of the LTSSM (Wb) of the device under test W with a handshake by the training pattern signal of Lane 1 transmitted from the second pattern generation unit 12 of the pattern generator 2 in the training mode.

In the measurement mode, when the pattern signal of Lane 1 generated by the second pattern generation unit 12 of the pattern generator 2 is input to the device under test W, the second pattern detection unit 14 detects the pattern signal of Lane 1 returned and input from the device under test W with the input of the pattern signal of Lane 1.

The error detection unit 15 compares the pattern signals of Lane 0 and Lane 1 as a test signal of a known pattern generated by the first pattern generation unit 11 and the second pattern generation unit 12 of the pattern generator 2 with the pattern signals of Lane 0 and Lane 1 returned from the device under test W with the transmission of the pattern signal of Lane 0 and Lane 1 and detected in the first pattern detection unit 13 and the second pattern detection unit 14 to detect bit errors in the measurement mode in a state in which the device under test W transits to the state of LOOPBACK.

The first link state management unit 16 includes the LTSSM 16a having the same mechanism as or a mechanism similar to the LTSSM (Wa) equipped in the device under test W and operates following a standard (in this example, USB 3.2) of an I/O interface in use. In this case, a state of waiting until a state transition condition of another lane is satisfied such that, even though the state transition condition for progressing to the next state is satisfied in Lane 0, Lane 0 does not transit to the next state until Lane 1 satisfies the state transition condition is defined. For example, in a case where a state transition condition from POLLING_ACTIVE to POLLING_CONFIGURATION is defined as "normal TS1 OS or TS2 OS is received successively eight times", each lane can progress to the next state when both Lane 0 and Lane 1 satisfy the state transition condition. In a case where a state transition condition from POLLING_CONFIGURATION to POLLING_IDLE is defined as "normal TS2 OS is received successively eight times and TS2 is received 16 times", each lane can progress to the next state when both Lane 0 and Lane 1 satisfy the state transition condition.

The first link state management unit 16 can recognize the transition of the state of the link state of Lane 0 like the LTSSM (Wa) of the device under test W and the current link state of the LTSSM (Wa) in the device under test W based on signals communicated with the device under test W. With this, for Lane 0, it is possible to obtain various kinds of information, such as an LTSSM value, a link speed, the presence or absence of loopback, a transition pattern of the LTSSM, a lane number for identifying the lane, a link number, a generation time or the number of times of generation of the pattern signal, an emphasis amount, and an adjustment value of an equalizer on a reception side.

The second link state management unit 17 includes the LTSSM 17a having the same mechanism as or a mechanism similar to the LTSSM (Wb) equipped in the device under test W, and similarly to the first link state management unit 16, operates following the standard (in this example, USB 3.2) of an I/O interface in use. In this case, similarly to the first link state management unit 16, a state of waiting until another lane satisfies a state transition condition such that, even though a state transition condition for progressing to a next state is satisfied in Lane 1, Lane 1 does not transit to the next state until Lane 0 satisfies the state transition condition is defined.

Similarly to the first link state management unit 16, the second link state management unit 17 can recognize the transition of the link state of Lane 1 like the LTSSM (Wb) of the device under test W and a current link state of the LTSSM (Wa) in the device under test W based on signals communicated with the device under test W. With this, for Lane 1, it is possible to obtain various kinds of information the same as the first link state management unit 16.

The first link state management unit 16 and the second link state management unit 17 recognize the link states of the counterpart lane, and various kinds of information are transferred depending on the link state.

The time generation unit 18 generates a current time and outputs generated time information to the log recording unit 18.

The log recording unit 19 records log information of each lane of Lane 0 and Lane 1 including the LTSSM value or the link speed managed by the first link state management unit 16 and the second link state management unit 17 by the handshake in the two-lane mode in the communication standard: USB 3.2 for making the LTSSM (Wa, Wb) of the device under test W transit to the state of LOOPBACK or log information including a measurement result of a bit error rate detected by the error detection unit 15 in the measurement mode, based on the time information generated in the time generation unit 18.

Examples of the log information recorded in the log recording unit 19 during the transition of the LTSSM 16a or 17a includes the LTSSM value, the link speed, the presence or absence of loopback, the transition pattern of the LTSSM, the lane number, the link number, the generation time or the number of times of generation of the pattern signal, the emphasis amount, and the adjustment value of the equalizer on the reception side.

The storage unit 20 stores the log information recorded by the log recording unit 19 under the control of the control unit 22. For example, a transition destination of the link state, the generation time of the transition, the trigger of the transition, and error information are stored in the storage unit 20 as the log information for each lane (Lane 0 or Lane 1) depending on the transition of the LTSSM 16a or 17a.

The display unit 21 displays the log information recorded by the log recording unit 19 or the log information stored in the storage unit 20 on a display screen 21a in a display form shown in FIGS. 4 to 7 under the control of the control unit 22. The display unit 21 displays a setting screen involved in error rate measurement, a measurement result including error information detected in the error detection unit 15 and recorded in the log recording unit 19, or the like under the control of the control unit 22 based on an operation of an operation unit (not shown).

The control unit 22 integrally controls each unit of the pattern generator 2 and the error detector 3 in performing the handshake in the two-lane mode with the device under test W or the measurement of the bit error rate.

Specifically, the control unit 22 instructs the first pattern generation unit 11 to the second pattern generation unit 12 to generate the training pattern signals of Lane 0 and Lane 1 to be next generated depending on current link states of the LTSSM 16a of the first link state management unit 16 and the LTSSM 17a of the second link state management unit 17 in the training mode.

The control unit 22 instructs the first pattern generation unit 11 and the second pattern generation unit 12 to generate the pattern signals of Lane 0 and Lane 1 in the measurement mode.

The control unit 22 performs control of writing the log information recorded in the log recording unit 19 to the storage unit 20 or reading of the log information stored in the storage unit 20, control of the display of the log information on the display screen 21a of the display unit 21, or the like.

Next, a method of performing a handshake in the two-lane mode between the error rate measuring apparatus 1 configured as above and the device under test W and displaying log data will be described referring to a flowchart of FIG. 2.

Figure 2:
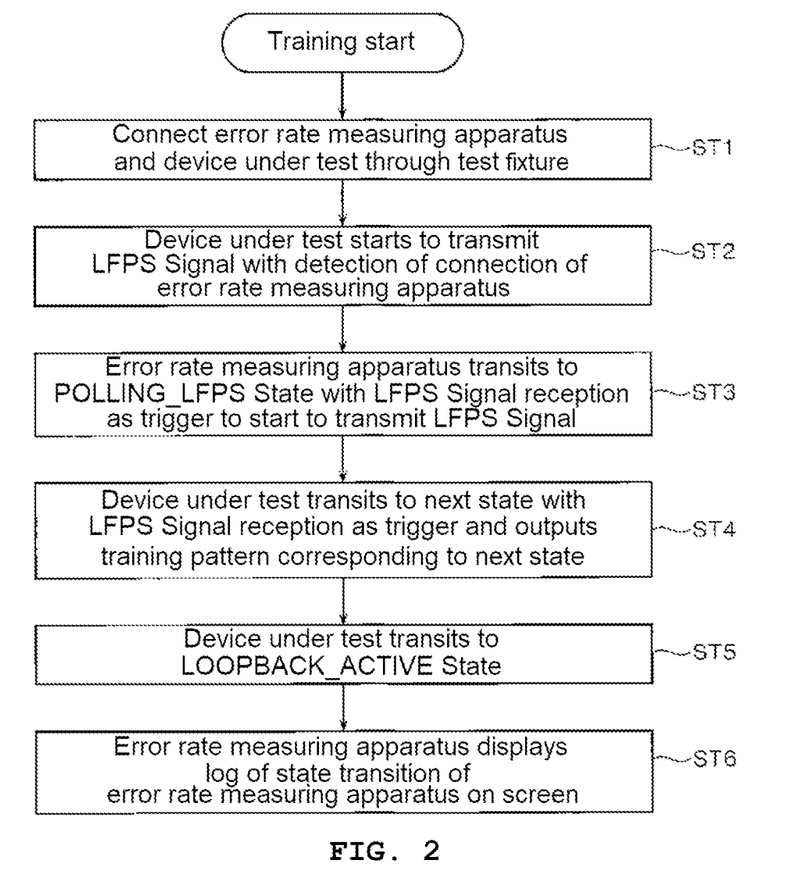
FIG. 2 is a flowchart showing a method of performing a handshake in a two-lane mode between the error rate measuring apparatus according to the invention and a device under test, and displaying a log.

Since an interface of a signal output unit of the error rate measuring apparatus 1 and an interface of a signal reception unit of the device under test W are different, the error rate measuring apparatus 1 and the device under test W are connected through the test fixture that is used in conversion for matching the interfaces (ST1 of FIG. 2).

In a case where the device under test W detects the connection with the error rate measuring apparatus 1 through the test fixture, the device under test W starts to transmit an LFPS signal as a training pattern signal (ST2 of FIG. 2).

The error rate measuring apparatus 1 transits to a POLLING_LFPS state with the reception of the LFPS signal transmitted from the device under test W as a trigger and starts to transmit an LFPS signal as a training pattern signal (ST3 of FIG. 2).

The device under test W transits to a next state with the reception of the LFPS signal transmitted from the error rate measuring apparatus 1 as a trigger and transmits a training pattern signal corresponding to the next state (ST4 of FIG. 2).

Then, the device under test W and the error rate measuring apparatus 1 transmit the training pattern signals defined in each state in Lane 0 and Lane 1 to perform state transition by the handshake in the two-lane mode, and the LTSSM (Wa, Wb) of the device under test W transits to a LOOPBACK_ACTIVE state for finally performing a test (ST5 of FIG. 2).

Figure 3:
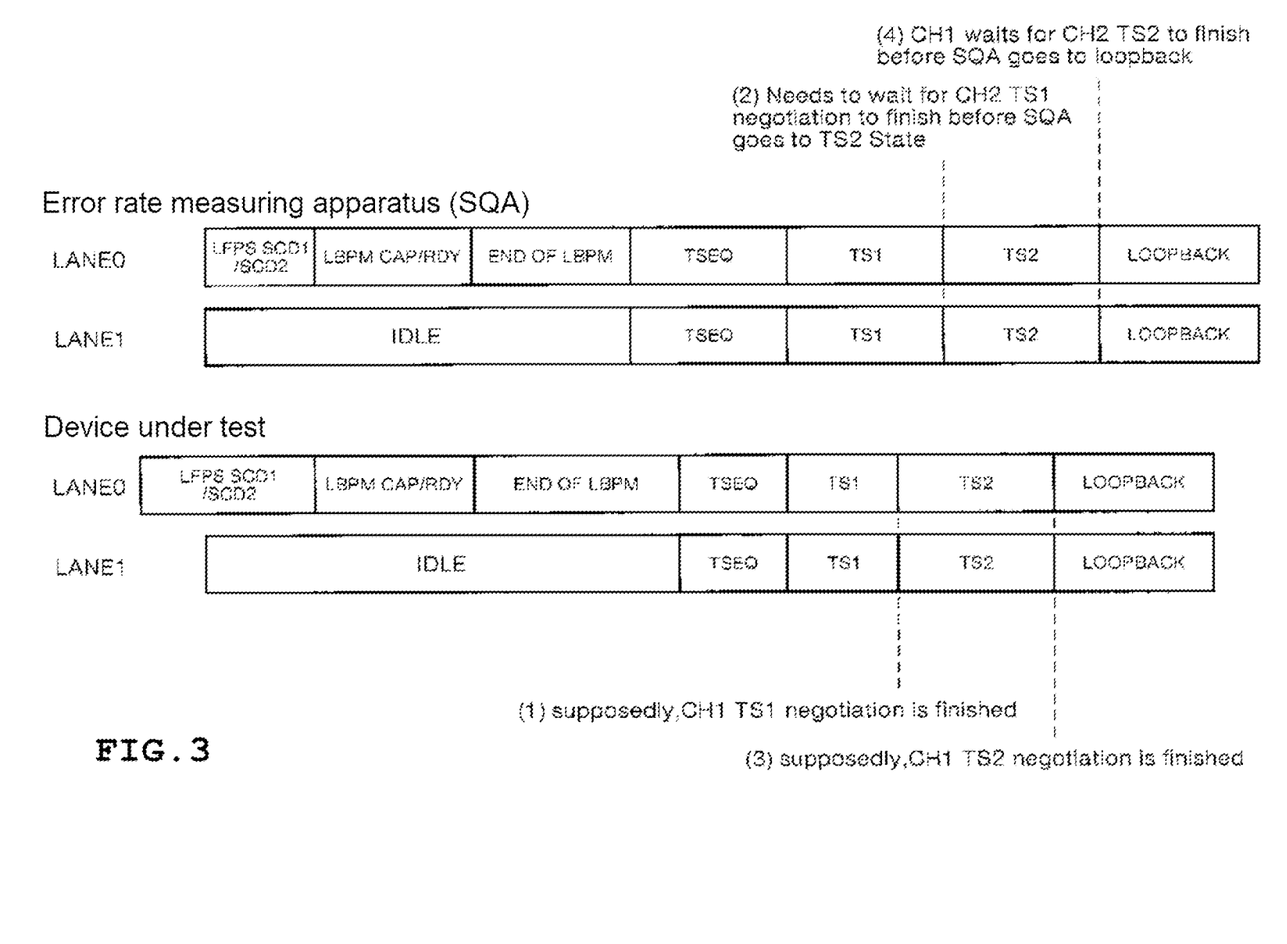
FIG. 3 is a diagram showing an example of a transition image when the handshake in the two-lane mode between the error rate measuring apparatus according to the invention and the device under test is successful.

Specifically, in a case where the two-lane handshake of the error rate measuring apparatus 1 and the device under test W is successful, as shown in FIG. 3, the device under test W transmits a pattern (a pattern associated with the state on a one-to-one basis) defined in each state to perform state transition in an order of LFPS SCD1/SCD2→LBPM CAP/RDY→END OF LBPM→TSEQ→TS1→TS2→LOOPBACK. As shown in FIG. 3, the error rate measuring apparatus 1 transmits the pattern defined in each state to perform state transition following the state transition of the device under test W.

Then, in a case where transition is made to LOOPBACK_ACTIVE state by the two-lane handshake of the device under test W and the error rate measuring apparatus 1, the error rate measuring apparatus 1 displays log data of state transition of each of Lane 0 and Lane 1 of the error rate measuring apparatus 1 on the display screen 21a of the display unit 21 (ST6 of FIG. 2).

Figure 4:
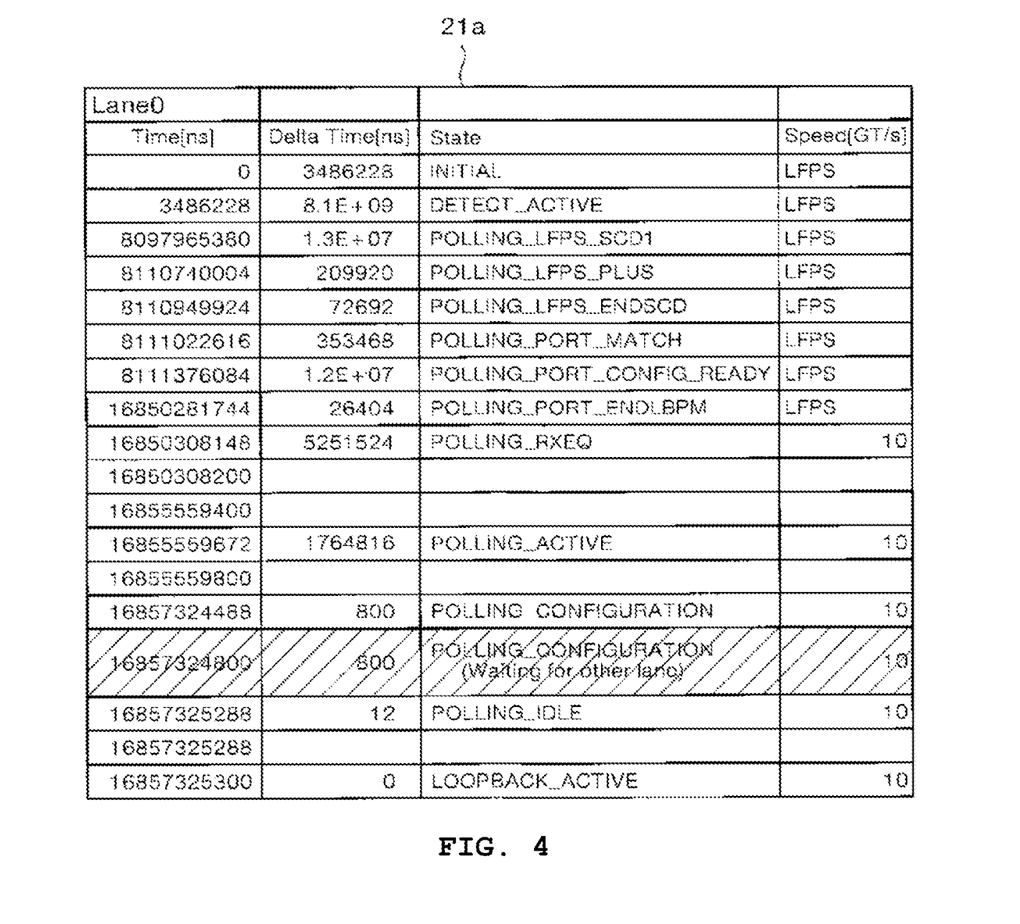
FIG. 4 is a diagram showing a display example of a log when a handshake is successful in Lane 0 of the error rate measuring apparatus according to the invention.
Figure 5:
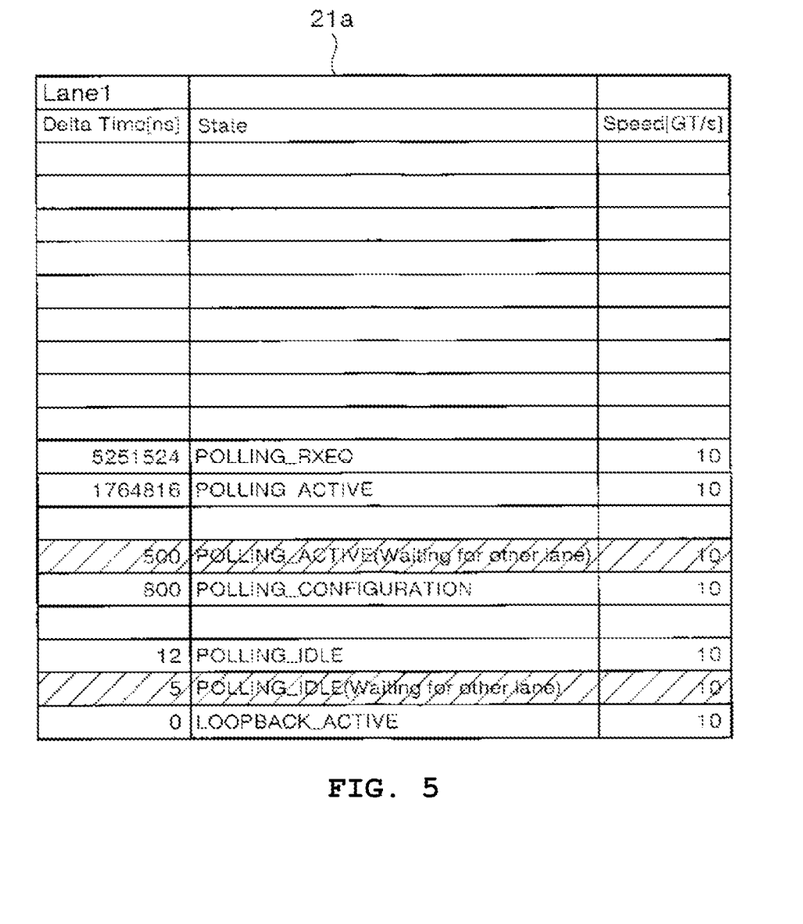
FIG. 5 is a diagram showing a display example of a log when a handshake is successful in Lane 1 of the error rate measuring apparatus according to the invention.

Specifically, in a case where the handshake in the two-lane mode by Lane 0 and Lane 1 of the error rate measuring apparatus 1 is successful, the log data of the state transition of each of Lane 0 and Lane 1 is disposed in a time-series order and is displayed on the display screen 21a in a display form shown in FIGS. 4 and 5. In this case, on the display screen 21a, in addition to the log data of the state transition, log data ("POLLING_CONFIGURATION (Waiting for other lane)" hatched in FIG. 4, "POLLING_ACTIVE (Waiting for other lane)" or "POLLING_IDLE (Waiting for other lane)" hatched in FIG. 5) indicating a state in which the lane satisfies a state transition condition and waits until another lane satisfies the state transition condition is also displayed.

According to the log data of the state transition of FIGS. 4 and 5, state transition is performed in an order of INITIAL→DETECT_ACTIVE→POLLING_LFPS_SCD1→POLLING_LFPS_PLUS→POLLING_LFPS_ENDSCD→POLLING_PORT_MATCH→POLLING_PORT_CONFIG_READY→POLLING_PORT_END-LBPM by a handshake of Lane 0 with a low speed signal initially.

Subsequently, a handshake of Lane 0 and Lane 1 with a high speed signal is performed, and after Lane 0 transits to a state of POLLING_RXEQ, Lane 1 transits to a state of POLLING_RXEQ. Thereafter, after Lane 1 transits to a state of POLLING_ACTIVE, Lane 0 transits a state of POLLING_ACTIVE.

Then, in a case where a handshake in POLLING_ACTIVE of Lane 1 is completed, Lane 1 waits until a handshake in POLLING_ACTIVE of Lane 0 is completed. Subsequently, in a case where the handshake in POLLING_ACTIVE of Lane 0 is completed, after Lane 1 transits to a state of POLLING_CONFIGURATION, Lane 0 transits to a state of POLLING_CONFIGURATION.

Thereafter, in a case where a handshake in POLLING_CONFIGURATION of Lane 0 is completed, Lane 0 waits until a handshake in POLLING_CONFIGURATION of Lane 1 is completed.

Then, in a case where the handshake in POLLING_CONFIGURATION of Lane 1 is completed, Lane 0 and Lane 1 transit to a state of POLLING_IDLE. Subsequently, after a handshake in POLLING_IDLE of Lane 1 is completed, Lane 1 waits until a handshake in POLLING_IDLE of Lane 0 is completed. Then, in a case where the handshake in POLLING_IDLE of Lane 0 is completed, Lane 0 and Lane 1 transit to a state of LOOPBACK_ACTIVE, and the handshake in the two-lane mode is successful.

Figure 6:
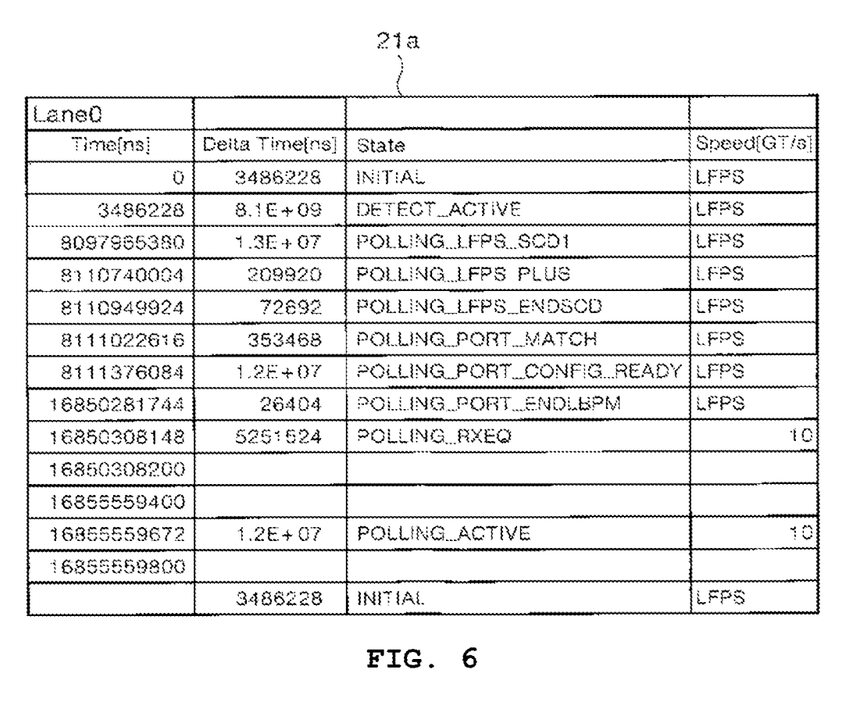
FIG. 6 is a diagram showing a display example of a log when the handshake fails in Lane 0 of the error rate measuring apparatus according to the invention.
Figure 7:
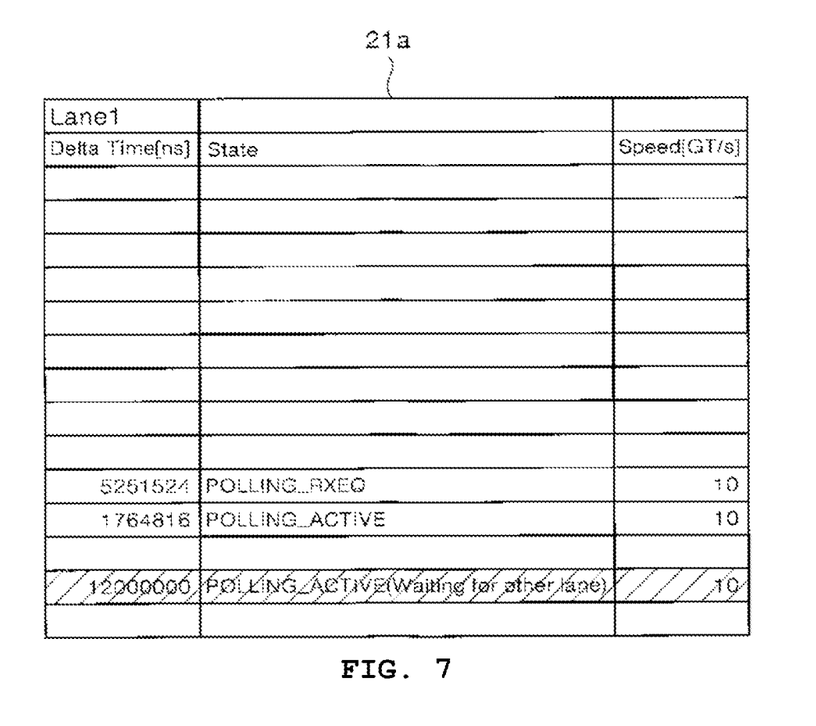
FIG. 7 is a diagram showing a display example of a log when the handshake fails in Lane 1 of the error rate measuring apparatus according to the invention.

In contrast, in a case where the handshake in the two-lane mode by Lane 0 and Lane 1 of the error rate measuring apparatus 1 fails, log data of state transition of each of Lane 0 and Lane 1 is disposed in a time-series order and is displayed on the display screen 21a in a display form shown in FIGS. 6 and 7. In this case, on the display screen 21a, in addition to the log data of the state transition, log data ("POLLING_ACTIVE (Waiting for other lane)" hatched in FIG. 7) indicating a state in which a lane satisfies a state transition condition and waits until another lane satisfies the state transition condition is also displayed.

According to the log data of the state transition of FIGS. 6 and 7, similarly to FIG. 4, state transition is performed in an order of INITIAL→DETECT_ACTIVE→POLLING_LFPS_SCD1→POLLING_LFPS_PLUS→POLLING_LFPS_ENDSCD→POLLING_PORT_MATCH→POLL- ING_PORT_CONFIG_READY→POLLING_PORT_ENDLBPM by a handshake of Lane 0 with a low speed signal initially.

Thereafter, a handshake of Lane 0 and Lane 1 with a high speed signal is performed, and after Lane 0 transits to a state of POLLING_RXEQ, Lane 1 transits to a state of POLLING_RXEQ. Subsequently, after Lane 1 transits to a state of POLLING_ACTIVE, Lane 0 transits to a state of POLLING_ACTIVE.

Then, after a handshake in POLLING_ACTIVE of Lane 1 is completed, Lane 1 waits until a handshake in POLLING_ACTIVE of Lane 0 is completed. Thereafter, a timeout occurs before the handshake in POLLING_ACTIVE of Lane 0 is completed, Lane 1 transits to the state of INITIAL, and the two-lane handshake ends in failure.

In FIGS. 4 to 7, Time [ns] indicates an elapsed time, Delta Time indicates a stay time of a state, State indicates a name of a state, and Speed [GT/s] indicates a signal name or a speed. In FIGS. 4 to 7, although the log data of the state transition of Lane 0 and Lane 1 is shown individually, the log data of the state transition of Lane 0 and Lane 1 when the two-lane handshake is successful shown in FIGS. 4 and 5 is displayed together on one display screen 21a of the display unit 21 in a time-series order, and the log data of the state transition of Lane 0 and Lane 1 when the two-lane handshake fails shown in FIGS. 6 and 7 is displayed together on one display screen 21a of the display unit 21 in a time-series order.

In this way, according to the embodiment, a function of simultaneously recording log data of a handshake of each of a plurality of lanes in a predetermined communication standard (HSB, such as PCIe or USB) and displaying the log data of the state transition recorded simultaneously is provided. A function of, in addition to the log data of the state transition of each lane, defining a state of waiting until another lane satisfies a state transition condition (a state of waiting until a lane satisfies a state transition condition for progressing to a next state and waits until another lane satisfies the state transition condition) and displaying log data including the state of waiting until another lane satisfies the state transition condition is provided.

With this, in testing the standard of a plurality of lanes, it is possible to allow the user to easily specify a lane and a test in which a cause of handshake failure occurs. As a result, since the user can specify a test and a lane that has a problem (for example, there is a problem in a lane that is not a lane waiting for a long time, depending on a state, it is possible to extremely efficiently perform debugging of an HSB device.

Although the best mode of the error rate measuring apparatus and the error rate measuring method according to the invention has been described above, the invention is not limited by the description and the drawings according to this mode. That is, it is a matter of course that other modes, examples, operation techniques and the like made by those skilled in the art based on this mode are all included in the scope of the present invention.

DESCRIPTION OF REFERENCE NUMERALS AND SIGNS 1 error rate measuring apparatus
2 pattern generator
11 first pattern generation unit
12 second pattern generation unit
3 error detector
13 first pattern detection unit
14 second pattern detection unit
15 error detection unit
16 first link state management unit
16a LTSSM
17 second link state management unit
17a LTSSM
18 time generation unit
19 log recording unit
20 storage unit
21 display unit
21a display screen
22 control unit
W device under test
Wa, Wb LTSSM

What is claimed is:

1. An error rate measuring apparatus having
a pattern generator configured to, when a device under test is in a signal pattern return mode in a predetermined communication standard, transmit a test signal of a known pattern to the device under test, and
an error detector configured to detect a bit error of input data returned from the device under test with the transmission of the test signal,
wherein the predetermined communication standard is a standard for performing communication in a plurality of lanes,
wherein the error rate measuring apparatus comprises:
a log recording unit configured to record log data of state transitions of each of the plurality of lanes when the device under test is transited to the signal pattern return mode in each lane,
wherein the log recording unit is configured to record a waiting state for one lane when the one lane satisfies a state transition condition for progressing to a next state and waits to progress to the next state until another lane satisfies the state transition condition, and
wherein the device under test and the error rate measuring apparatus comprise a same link training and status state machine.

2. The error rate measuring apparatus according to claim 1, further comprising:
a display unit that displays the log data of the state transitions of each lane recorded in the log recording unit in a time-series order.

3. The error rate measuring apparatus according to claim 1, wherein the communication standard is a communication standard of a high speed serial bus.

4. The error rate measuring apparatus according to claim 1, further comprising:
a display unit that displays on one display screen the log data of the state transitions of each lane recorded in the log recording unit when a two-lane handshake communication in each lane succeeds or fails in a time-series order.

5. An error rate measuring method for an error rate measuring apparatus having a pattern generator that, when a device under test is in a signal pattern return mode in a predetermined communication standard, transmits a test signal of a known pattern to the device under test,
the predetermined communication standard being a standard for performing communication in a plurality of lanes, and
an error detector that detects a bit error of input data returned from the device under test with the transmission of the test signal, the error rate measuring method comprising:

a step of recording log data of state transitions of each of the plurality of lanes when the device under test is transited to the signal pattern return mode in each lane, at a log recording unit provided in the error detector, wherein recording the log data comprises recording data that indicates a waiting state for one lane when the one lane satisfies a state transition condition for progressing to a next state and waits to progress to the next state until another lane satisfies the state transition condition, and wherein the device under test and the error rate measuring apparatus comprise a same link training and status state machine.

6. The error rate measuring method according to claim 5, further comprising:

a step of displaying the log data of the state transition of each lane recorded in the log recording unit on a display unit in a time-series order.

7. The error rate measuring method according to claim 5, wherein the communication standard is a communication standard of a high speed serial bus.

8. The error rate measuring method according to claim 5, further comprising:

a step of displaying on one display screen the log data of the state transitions of each lane recorded in the log recording unit when a two-lane handshake communication in each lane succeeds or fails on a display unit in a time-series order.

\* \* \* \* \*